Nov. 29, 1966     C. RYZNER     3,288,035
MOTION TRANSMITTING APPARATUS
Filed Aug. 6, 1962     2 Sheets-Sheet 1
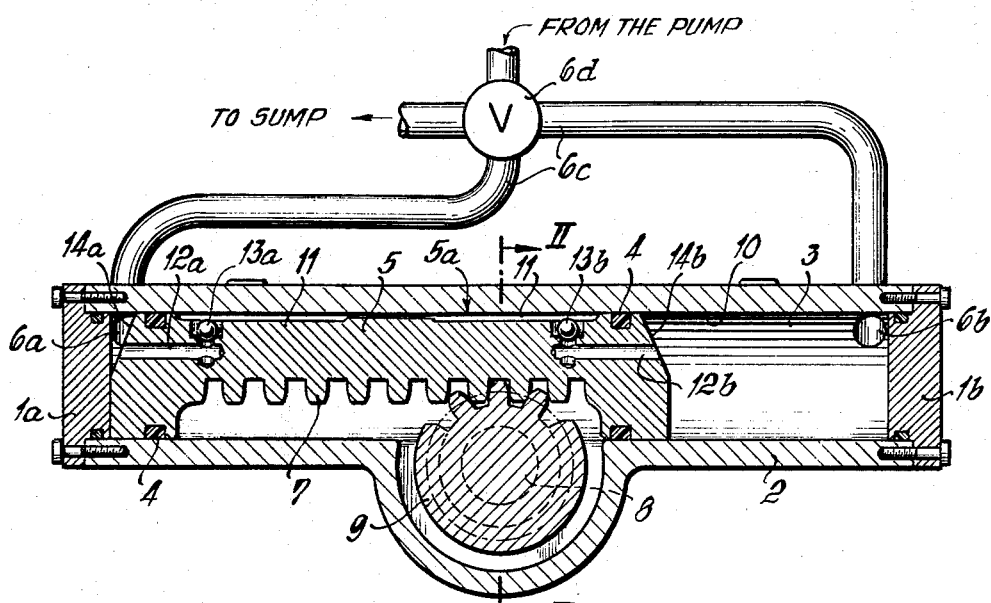
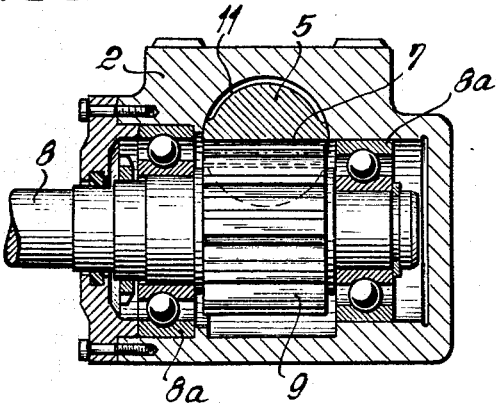
INVENTOR
Clemens RYZNER
BY
Michael S. Striker
his ATTORNEY

# United States Patent Office 3,288,035
Patented Nov. 29, 1966

3,288,035
MOTION TRANSMITTING APPARATUS
Clemens Ryzner, Sprockhoevel, Germany, assignor to Paul Pleiger Maschinenfabrik, Hammerthal-Nord, Germany
Filed Aug. 6, 1962, Ser. No. 215,134
8 Claims. (Cl. 91—467)

The present invention relates to motion transmitting apparatus in general, and more particularly to improvements in a hydraulic apparatus which can transform reciprocatory linear movements into oscillating rotary movements or vice versa. Still more particularly, the invention relates to a hydraulic apparatus which is especially suited for transforming reciprocatory linear movements of a double acting piston into oscillating rotary movements of an output shaft adapted to control movements of one or more parts in a machine tool or the like and receiving motion through a rack and pinion drive.

In such apparatus, the mating teeth of the rack and pinion transmit to the piston a pressure whose magnitude often approximates one-third of the fluid pressure prevailing in the cylinder chamber of the housing in which the piston reciprocates. Such mechanically generated pressure is transmitted by the piston to the housing of the hydraulic apparatus and produces substantial friction resulting in excessive wear of the piston and/or the housing and leakage of pressure fluid along the periphery of the piston. Furthermore, the accuracy and efficiency of the apparatus diminish with progressive wear upon and with resultant rattling of the piston. The mechanical pressure which the rack transmits to the piston is due to the angle which the flanks of teeth on the rack enclose with the flanks of teeth on the pinion.

Accordingly, it is an important object of the present invention to provide a hydraulic motion transmitting apparatus of the above outlined characteristics which is constructed and assembled in such a way that the wear upon the piston and its housing is reduced with resultant higher efficiency of the apparatus and longer useful life of its parts.

Another object of the invention is to provide a hydraulic apparatus for transforming reciprocatory motion of a double acting piston into oscillating rotary motion wherein the fluid utilized for producing reciprocatory motion simultaneously prevents excessive friction between the piston and its housing.

A further object of the invention is to provide a fully automatic pressure balancing system for an apparatus of the just outlined characteristics and to install the pressure balancing system in such a way that the dimensions of the apparatus remain unchanged.

An additional object of my invention is to provide a pressure balancing system which is capable of at least partially reducing friction between the piston and its housing in order to at least partly counteract the mechanical force with which the rack and pinion drive tends to press the piston against the internal wall of the housing.

Still another object of the invention is to provide a balancing system of the above outlined characteristics which is constructed and assembled in such a way that the piston is not subjected to tilting forces when it reciprocates in its housing.

With the above objects in view, the invention resides in the provision of a hydraulic motion transmitting apparatus including a housing having an elongated cylinder chamber for a reciprocable piston, a rack and pinion drive which reciprocates the piston or whose pinion is alternately rotated in opposite directions when the piston is reciprocated by hydraulic pressure fluid, and hydraulic balancing means which comprises at least one recess formed in the periphery of the piston and/or in the internal wall of the housing substantially diametrically opposite the pinion so that a pressure fluid admitted into such recess or recesses counteracts the pressure which the mating teeth of the rack and pinion drive transmit to the piston. The rack is connected to or integral with the piston, and the arrangement is preferably such that the recess or recesses of the balancing means always communicate with that portion of the cylinder chamber which momentarily receives pressure fluid but are sealed from the other portion of the chamber which discharges spent fluid.

The novel features which are considered as characteristic of the invention are set forth in particular in the appended claims. The invention itself, however, both as to its construction and its method of operation, together with additional objects and advantages thereof, will be best understood from the following detailed description of certain specific embodiments with reference to the accompanying drawings, in which:

FIG. 1 is an axial section through a hydraulic apparatus which is utilized for transforming reciprocating motion of a double acting piston into oscillating rotary motion of a pinion and which is provided with balancing means embodying one form of my invention;

FIG. 2 is a transverse section as seen in the direction of arrows from the line A–B of FIG. 1;

Figure 3:
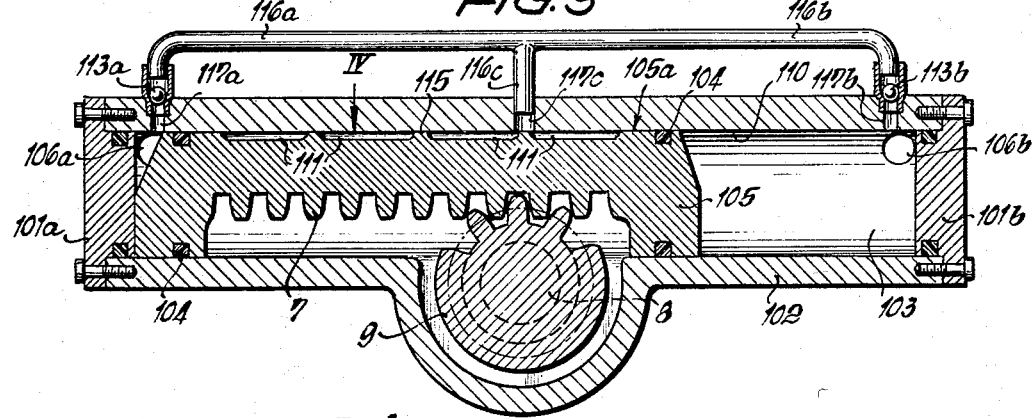
FIG. 3 is an axial section through a modified hydraulic apparatus.

Referring now in greater detail to the illustrated embodiments, and first to the hydraulic apparatus of FIGS. 1 and 2, there is shown an elongated housing 2 whose ends are sealed by covers 1a, 1b and which defines an elongated cylinder chamber 3 of circular cross section. This chamber receives an elongated double acting piston 5 whose axially spaced end portions are provided with peripheral grooves for annular sealing rings 4, and the piston 5 having a tight sliding fit in the wall bounding the bore 3. The housing 2 is formed with two spaced fluid conveying ports 6a, 6b which are respectively adjacent to the covers 1a, 1b and whose spacing exceeds the axial length of the piston 5 so that the latter is caused to reciprocate in its chamber when a hydraulic pressure fluid (e.g., oil) is alternately admitted through the ports 6a, 6b. The ports communicate with conduits 6c leading to a reversing valve 6d of any known design which operates in a sense to admit pressure fluid from the pressure side of a pump or the like to one of the ports 6a, 6b when the other port is free to discharge spent fluid into a sump, or vice versa.

The underside of the piston 5, as viewed in FIG. 1 or 2, is formed with an elongated rack 7 whose teeth mate with the teeth of a pinion 9 coaxially secured to an output shaft 8, the latter mounted in bearings 8a and having a stub projecting from the housing 2 so as to transmit oscillating rotary motion to one or more driven parts, not shown. The mounting of the shaft 8 is such that the pinion 9 is free to rotate in but is held against axial movements with respect to the housing 2. The axis of the shaft 8 is perpendicular to the axis of the piston 5 and the axial length of the rack 7 is slightly less than the distance between the sealing rings 4. In the embodiment of FIGS. 1 and 2, the rack 7 and the pinion 9 are respectively integral with the piston 5 and with the output shaft 8. When the piston 5 is caused to move in a direction to the right, as viewed in FIG. 1, the shaft 8 rotates in a clockwise direction, and the direction of rotation of this shaft is reversed when the piston is caused to move back to the position of FIG. 1.

When the shaft 8 is driven, the teeth of the pinion 9 transmit pressure to the teeth of the rack 7 whereby the upper peripheral portion 5a of the piston, as viewed in FIG. 1, which is located substantially diametrically opposite the pinion 9 is pressed against the adjacent portion 10 of the internal housing wall bounding the chamber 3. Such pressure can cause excessive wear on the piston and/or on the housing 2 and, therefore, I provide a novel hydraulic balancing means which counteracts the stresses transmitted to the piston by the mating teeth of the rack and pinion in the following manner:

The peripheral portion 5a of the piston 5 is formed with a pair of spaced but interconnected grooves or recesses 11 which communicate with ducts 12a, 12b leading to the opposite end faces of the piston 5 and thus respectively communicating with the fluid conveying ports 6a, 6b. These ducts accommodate one-way valves 13a, 13b which permit inflow of pressure fluid into the recesses 11 but which always prevent outflow of pressure fluid from these recesses. As shown in FIG. 1, portions of the end faces on the piston 5 are cut off, as at 14a, 14b, to thereby reduce the pressure between the wall portion 10 and the adjacent peripheral portion 5a of the piston by directing pressure fluid in such a way that the peripheral portion 5a tends to move away from the wall portion 10. In addition, the cut-off portions 14a, 14b of the piston insure that the latter cannot prevent inflow or outflow of pressure fluid through the ports 6a, 6b even if one of its end faces is in actual abutment with the one or the other cover. It will be noted that the cut-off portions 14 are at least slightly inclined with respect to a plane which is perpendicular to the axis of the piston 5.

The hydraulic apparatus of FIGS. 1 and 2 operates as follows:

When the reversing valve 6d admits pressure fluid through the left-hand port 6a, the piston 5 moves to the right and the mating teeth of the rack 7 and pinion 9 cause the output shaft 8 to rotate in a clockwise direction. At the same time, pressure fluid filling the left-hand portion of the chamber 3 is free to flow through the left-hand duct 12a and through the left-hand valve 13a to fill the communicating recesses 11 and to thereby counteract the pressure with which the mating teeth of the pinion 9 and rack 7 urge the peripheral portion 5a of the piston against the wall portion 10 of the housing 3. The fluid filling the recesses 11 maintains the right-hand valve 13b in sealing position so that no fluid can escape through the right-hand duct 12b. As the piston moves in a direction to the right, its right-hand end face expels fluid from the right-hand portion of the chamber 3 and such spent fluid flows through the right-hand port 6b, through the valve 6d and back to the sump. The situation is just the opposite when the valve 6d reverses the direction of fluid flow, i.e., when pressure fluid is admitted through the right-hand port 6b. The piston 5 then moves to the left and the pressure fluid filling the right-hand portion of the chamber 3 may pass through the right-hand duct 12b and through the right-hand valve 13b to maintain the fluid which fills the recesses 11 under compression and to prevent the peripheral portion 5a from bearing against the wall portion 10, while the left-hand valve 13a prevents escape of fluid from the recesses 11 and the left-hand port 6a conveys spent fluid to the valve 6d and back to the sump.

It will be noted that the combined axial length of the recesses 11 is somewhat less than the distance between the sealing rings 4 and that these rings are located at the opposite axial ends of the recesses. The width of the recesses 11 may diminish in a direction toward the respective rings 4.

The fluid pressure in the recesses 11 equals the fluid pressure prevailing in the chamber 3 so that the resistance which the balancing means offers to the pressure of mating teeth on the rack and pinion drive is always proportional to the fluid pressure. Since the pressure exerted by the rack and pinion drive fluctuates with changes in pressure of the hydraulic fluid, the resistance of pressure fluid filling the recesses 11 is always proportional to the mechanical pressure which tends to bias the peripheral portion 5a against the wall portion 10.

Figure 4:
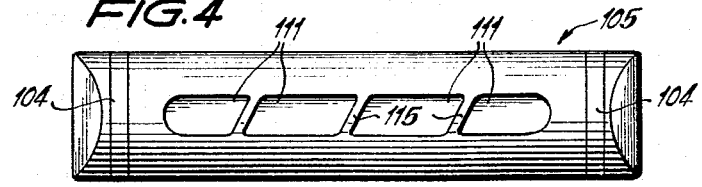
FIG. 4 is an elevational view of a piston which forms part of the modified hydraulic apparatus, the view of FIG. 4 being taken in the direction of arrow IV in FIG. 3.

In the hydraulic apparatus of FIGS. 3 and 4, the peripheral portion 105a of the piston 105 is formed with four axially staggered recesses or cutouts 111 which are sealed from each other by ribs 115, the latter sealingly engaging the wall portion 110 of the housing 102. The housing is provided with a central duct 117c and with two additional ducts 117a, 117b. The duct 117c always communicates with at least one recess 111 and may alternately communicate with the ducts 117a, 117b through a system of connecting conduits 116a, 116b, 116c. These conduits may be replaced by bores drilled into the body of the housing 102. The ducts 117a, 117b are respectively adjacent to the left-hand and to the right-hand ports 106a, 106b and are provided with one-way valves 113a, 113b which permit unidirectional flow of hydraulic pressure fluid. Thus, when the fluid enters the chamber 103 through the left-hand port 106a and moves the piston 105 in a direction to the right, as viewed in FIG. 3, the fluid flows through the duct 117a, through the valve 113a, through the conduits 116a, 116c, through the duct 117c and into at least one recess 111 so as to counteract the mechanical pressure at which the mating teeth of rack 7 and pinion 9 press the peripheral portion 105a of the piston against the wall portion 110. At the same time, the other one-way valve 113b prevents escape of pressure fluid from the conduit 116b so that the recesses 111 are effectively sealed from the right-hand port 106b through which spent fluid escapes from the housing 102. The valve 113b opens and the valve 113a closes when the piston 105 moves in the opposite direction, i.e., when the right-hand port 106b admits pressure fluid to the chamber 103. The ends of the housing 102 are sealed by covers 101a, 101b, and the piston 105 is provided with spaced sealing rings 104 which are disposed at the other ends of the outermost recesses 111.

It will be noted that the diameter of the duct 117c exceeds the width of a rib 115 so that the duct 117c always communicates with at least one recess 111.

Figure 5:
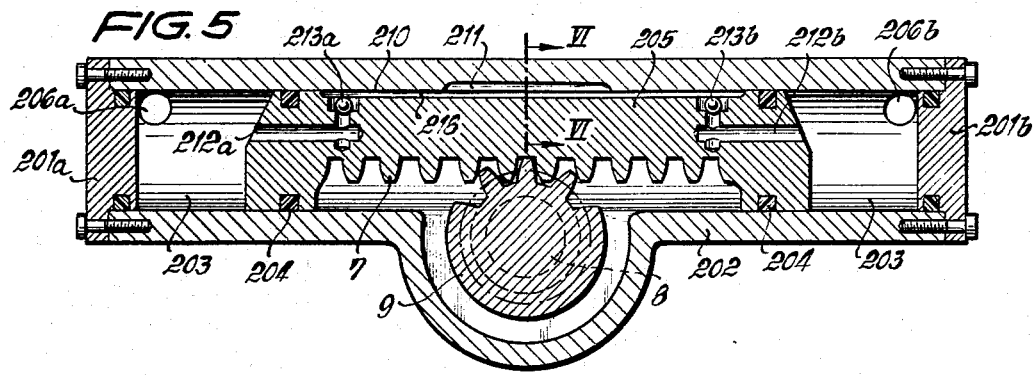
FIG. 5 is an axial section through a further hydraulic apparatus.
Figure 6:
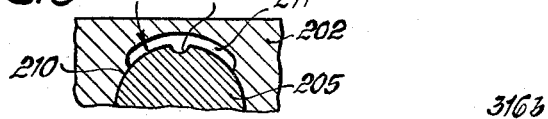
FIG. 6 is a fragmentary transverse section as seen in the direction of arrows from the line C–D in FIG. 5.

Referring to FIGS. 5 and 6, there is shown a different hydraulic apparatus including a housing 202 and a piston 205. The wall portion 210 of the housing 202 is formed with a recess 211 which is located diametrically opposite the pinion 9 and which communicates with an elongated channel or recess 218 machined into the peripheral portion 205a of the piston 205. The channel 218 extends in the axial direction of and in part circumferentially about the piston and alternately communicates with ducts 212a, 212b when the respective one-way valve 213a, 213b is open. Otherwise, the construction of this hydraulic apparatus is identical with that of the apparatus shown in FIGS. 1 and 2. When the left-hand port 206a admits pressure fluid to the chamber 203, the piston 205 moves in a direction to the right, as viewed in FIG. 5, and pressure fluid entering the left-hand duct 212a opens the valve 213a to flow through the channel 218 and into the recess 211. The right-hand valve 213b closes automatically and prevents pressure fluid contained in the recess 211 from escaping through the duct 212b. When the port 206b admits pressure fluid, the valve 213b is open but the valve 213a closes automatically so that pressure fluid filling the recess 211 counteracts the pressure of mating teeth on the gear 9 and pinion 7.

The sealing rings 204 and covers 201a, 201b are identical with those shown in FIGS. 1 and 3, and it will be noted that the rings 204 are located at the opposite axial ends of the channel 218.

Figure 7:
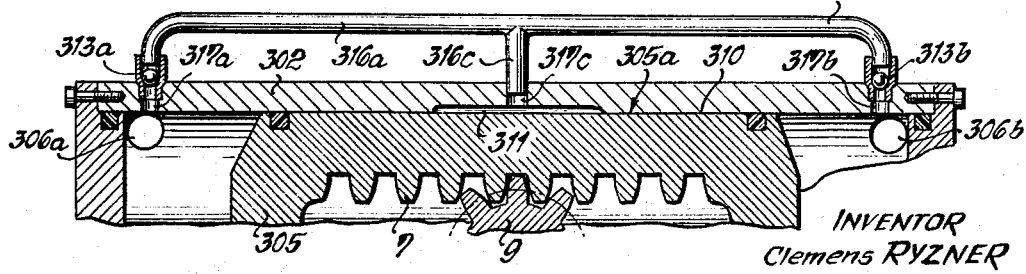
FIG. 7 is a fragmentary axial section through a different hydraulic apparatus.

FIG. 7 illustrates a hydraulic apparatus which embodies the features of the apparatus shown in FIGS. 3 and 5. The recess 311 is provided in the wall portion 310 of the housing 302, and the housing comprises three ducts 317a, 317b, 317c which respectively communicate with conduits 316a, 316b, 316c. The ducts 317a, 317b accommodate one-way valves 313a, 313b whose function is the same as that of the valves 113a, 113b shown in FIG. 3. The peripheral portion 305a of the piston 305 need not be provided with a channel, such as the channel 218 of FIG. 5 or 6, because admission of pressure fluid into the recess 311 takes place through the conduits 316a, 316c or 316b, 316c.

The ports 306a, 306b are connected with a reversing valve in the same manner as shown in FIG. 1.

It will be readily understood that the hydraulic apparatus of my invention may be utilized for transforming oscillating rotary motion of the pinion shaft into reciprocatory motion of the piston so that the housing and the piston constitute a pump.

In all embodiments of my invention, the housing and/or the piston are provided with one or more recesses 11, 111, 211 or 311 which are located substantially diametrically opposite the mating teeth of the rack 7 and pinion 9 to counteract the pressure which the mating teeth transmit to the piston and hence to the internal wall of the housing. In other words, I provide hydraulic balancing means which at least partially compensates for mechanical stresses which the mating teeth transmit to the housing. While the apparatus of FIGS. 1 and 3 comprise hydraulic balancing means which are active along the entire or along the major part of the piston 5 or 105, the hydraulic balancing means of FIGS. 5 and 7 are active mainly or exclusively along that part of the internal housing wall 210 or 310 which is located directly opposite the pinion 9. Such arrangement protects the piston from tilting forces. The tilting forces are practically eliminated when the hydraulic balancing means is constructed in a manner as shown in FIG. 7.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. A hydraulic apparatus for transforming reciprocating motion into oscillating rotary motion, comprising a housing member defining an elongated cylinder chamber having two sealed ends, and a fluid conveying port adjacent to each of said ends and communicating with said chamber; a double acting piston member reciprocably received in said chamber and having a first and a second end face, said piston member slidably fitted into said housing member and having an axial length less than the distance between said ports; a toothed rack rigid with and extending in the axial direction of said piston member; a pinion rotatably mounted in said housing member and having teeth mating with the teeth of said rack so as to alternately rotate in opposite directions when said piston member reciprocates in said chamber, said piston member having a peripheral portion disposed substantially diametrically opposite said pinion and said housing member having an internal wall portion adjacent to said peripheral portion, said peripheral portion tending to bear against said wall portion in response to pressure transmitted to said piston member by said mating teeth when the pinion rotates; and hydraulic balancing means, said hydraulic balancing means being located exclusively in the region of said pinion but at the opposite side therefrom of said rack for counteracting the pressure generated by said teeth, said balancing means comprising at least one recess provided in said peripheral portion, first and second duct means extending inwardly from the respective end faces of said piston member, and one-way valve means provided in each of said duct means for permitting inflow of pressure fluid from said chamber into said recess means and for preventing return flow of pressure fluid from said recess means whereby the pressure fluid which reciprocates said piston member simultaneously counteracts the pressure of said mating teeth by being maintained at a fluid pressure sufficiently high to compensate at least partially for the mechanical stresses which said mating teeth transmit to the piston member, said hydraulic balancing means arranged to counteract said pressure at all times during reciprocatory movement of said piston irrespective of the axial position of the latter with respect to said chamber.

2. A hydraulic apparatus for transforming reciprocating motion into oscillating rotary motion, comprising a housing member defining an elongated cylinder chamber having two sealed ends, and a fluid conveying port adjacent to each of said ends and communicating with said chamber; a double acting piston member reciprocably received in said chamber and having a first and a second end face, said piston member slidably fitted into said housing member and having an axial length less than the distance between said ports; a toothed rack rigid with and extending in the axial direction of said piston member; a pinion rotatably mounted in said housing member and having teeth mating with the teeth of said rack so as to alternately rotate in opposite directions when said piston member reciprocates in said chamber, said piston member having a peripheral portion disposed substantially diametrically opposite said pinion and said housing member having an internal wall portion adjacent to said peripheral portion, said peripheral portion tending to bear against said wall portion in response to pressure transmitted to said piston member by said mating teeth when the pinion rotates; and hydraulic balancing means, said hydraulic balancing means being located exclusively in the region of said pinion but at the opposite side therefrom of said rack for counteracting the pressure generated by said teeth, said balancing means comprising at least one recess provided in said wall portion, channel means provided in said peripheral portion and communicating with said recess, first and second duct means extending inwardly from the respective end faces of said piston member and communicating with said channel means, and one-way valve means provided in each of said duct means for permitting inflow of pressure fluid from said chamber into said channel means and into said recess and for preventing outflow of fluid from said channel means, the fluid received in said recess being maintained at a pressure sufficiently high to compensate at least partially for the mechanical stresses which said mating teeth transmit to the piston member, said hydraulic balancing means arranged to counteract said pressure at all times during reciprocatory movement of said piston irrespective of the axial position of the latter with respect to said chamber.

3. A hydraulic apparatus as set forth in claim 2, wherein said recess is disposed opposite said pinion and wherein said channel means extends in the axial direction of said piston member.

4. A hydraulic apparatus for transforming reciprocating motion into oscillating rotary motion, comprising a housing member defining an elongated cylinder chamber having two sealed ends, and a fluid conveying port adjacent to each of said ends and communicating with said chamber; a double acting piston member reciprocably received in said chamber, said piston member slidably fitted into said housing member and having an axial length less than the distance between said ports; a toothed rack rigid with and extending in the axial direction of said piston member; a pinion rotatably mounted in said housing member and having teeth mating with the teeth of said rack so as to alternately rotate in opposite directions when said piston member reciprocates in said chamber, said piston member having a peripheral portion disposed substantially diametrically opposite said pinion and said housing member having an internal wall portion adjacent to said peripheral portion, said peripheral portion tending to bear against said wall portion in response to pressure transmitted to said piston member by said mating teeth when the pinion rotates; and hydraulic balancing means, said hydraulic balancing means being located exclusively in the region of said pinion but at the opposite side therefrom of said rack for counteracting the pressure of said mating teeth, said balancing means comprising a plurality of axially spaced recesses provided in said peripheral portion, rib means forming part of said piston member and sealingly engaging said wall portion between said recesses so as to seal said recesses from each other, and fluid-admitting duct mean provided in said wall portion and communicating with at least one of said recesses, said duct means disposed substantially opposite said pinion whereby at least that recess which is momentarily located opposite said pinion receives pressure fluid when said piston member reciprocates in said chamber so that the pressure fluid of said mating teeth is counteracted at all times during reciprocatory movement of said piston irrespective of the axial position thereof with respect to said chamber, the fluid received in said recess being maintained at a pressure sufficiently high to compensate at least partially for the mechanical stresses which said mating teeth transmit to the piston member.

5. A hydraulic apparatus for transforming reciprocating motion into oscillating rotary motion, comprising a housing member defining an elongated cylinder chamber having two sealed ends, and a fluid conveying port adjacent to each of said ends and communicating with said chamber; a double acting piston member reciprocably received in said chamber, said piston member slidably fitted into said housing member and having an axial length less than the distance between said ports; fluid flow regulating reversing means operatively connected with and alternately admitting a hydraulic pressure fluid to said ports so that the piston member is caused to reciprocate in said chamber; a toothed rack rigid with and extending in the axial direction of said piston member; a pinion rotatably mounted in said housing member and having teeth mating with the teeth of said rack so as to alternately rotate in opposite directions when said piston member reciprocates in said chamber, said piston member having a peripheral portion disposed substantially diametrically opposite said pinion and said housing member having an internal wall portion adjacent to said peripheral portion, said peripheral portion tending to bear against said wall portion in response to pressure transmitted to said piston member by said mating teeth when the pinion rotates; and hydraulic balancing means, said hydraulic balancing means being located exclusively in the region of said pinion but at the opposite side therefrom of said rack element for counteracting the pressure generated by said teeth, said balancing means comprising recess means provided in said wall portion substantially diametrically opposite said opinion, central duct means provided in said housing member and communicating with said recess means, a pair of additional duct means each provided in said housing member in the proximity of one of said ports and communicating with said chamber, conduit means connecting said central duct with said additional ducts, and one-way valve means in each of said additional ducts for permitting inflow of pressure fluid from said chamber into said recess means and for preventing escape of pressure fluid into said chamber, the fluid received in said recess being maintained at a pressure sufficiently high to compensate at least partially for the mechanical stresses which said mating teeth transmit to the piston member.

6. A hydraulic apparatus as set forth in claim 5, wherein said conduit means is provided externally of said housing member.

7. A hydraulic apparatus for transforming reciprocating motion into oscillating rotary motion, comprising a housing member defining an elongated cylinder chamber having two sealed ends, and a fluid conveying port adjacent to each of said ends and communicating with said chamber; a double acting piston member reciprocably received in said chamber, said piston member slidably fitted into said housing member and having an axial length less than the distance between said ports; fluid flow regulating reversing means operatively connected with and alternately admitting a hydraulic pressure fluid to said ports so that the piston member is caused to reciprocate in said chamber; a toothed rack rigid with and extending in the axial direction of said piston member; a pinion rotatably mounted in said housing member and having teeth mating with the teeth of said rack so as to alternately rotate in opposite directions when said piston member reciprocates in said chamber, said piston member having a peripheral portion disposed substantially diametrically opposite said pinion and said housing member having an internal wall portion adjacent to said peripheral portion, said peripheral portion tending to bear against said wall portion in response to pressure transmitted to said piston member by said mating teeth when the pinion rotates; and hydraulic balancing means, said hydraulic balancing means being located exclusively in the region of said pinion but at the opposite side therefrom of said rack for counteracting the pressure generated by said teeth, said hydraulic balancing means arranged to counteract said pressure at all times during reciprocatory movement of said piston irrespective of the axial position of the latter with respect to said chamber, said balancing means comprising at least one recess provided in at least one of said portions and duct means provided in one of said members for admitting hydraulic pressure fluid to said recess means, and wherein said recess means is provided in the peripheral portion of said piston member.

8. A hydraulic apparatus for transforming reciprocating motion into oscillating rotary motion, comprising a housing member defining an elongated cylinder chamber having two sealed ends, and a fluid conveying port adjacent to each of said ends and communicating with said chamber; a double acting piston member reciprocably received in said chamber, said piston member slidably fitted into said housing member and having an axial length less than the distance between said ports; fluid flow regulating reversing means operatively connected with and alternately admitting a hydraulic pressure fluid to said ports so that the piston member is caused to reciprocate in said chamber; a toothed rack rigid with and extending in the axial direction of said piston member; a pinion rotatably mounted in said housing member and having teeth mating with the teeth of said rack so as to alternately rotate in opposite directions when said piston member reciprocates in said chamber, said piston member having a peripheral portion disposed substantially diametrically opposite said pinion and said housing member having an internal wall portion adjacent to said peripheral portion, said peripheral portion tending to bear against said wall portion in response to pressure transmitted to said piston member by said mating teeth when the pinion rotates; and hydraulic balancing means, said hydraulic balancing means being located exclusively in the region of said pinion but at the opposite side therefrom of said rack for counteracting the pressure generated by said teeth, said hydraulic balancing means arranged to counteract said pressure at all times during reciprocatory movement of said piston irrespective of the axial position of the latter with respect to said chamber, said balancing means comprising at least one recess provided in at least one of said portions and duct means provided in one of said members for admitting hydraulic pressure fluid to said members for admitting hydraulic pressure fluid to said recess means, and wherein said piston member is provided with axially spaced sealing means engaging said housing member, said recess means being provided in said wall portion intermediate said sealing means, the overall axial length of said recess means, the distance between said sealing means, and the length of said chamber being selected in such a way that said recess means is always located between said sealing means.

References Cited by the Examiner

UNITED STATES PATENTS

| | | | |
|---|---|---|---|
| 688,665 | 12/1901 | Morrissett | 92—127 |
| 1,064,542 | 6/1913 | Rittersbach | 92—127 |
| 1,652,033 | 12/1927 | Martyn | 92—127 |
| 1,679,964 | 8/1928 | Edwards | 92—127 |
| 2,495,516 | 1/1950 | Foster | 92—127 |
| 2,830,461 | 4/1958 | Sheppard | 92—136 |
| 2,833,602 | 5/1958 | Bayer | 92—136 |
| 2,844,128 | 7/1958 | Steiner | 92—136 |

FOREIGN PATENTS

| | | |
|---|---|---|
| 194,008 | 3/1923 | Great Britain. |
| 194,959 | 3/1923 | Great Britain. |

MARTIN P. SCHWADRON, *Primary Examiner.*

SAMUEL LEVINE, *Examiner.*

P. T. COBRIN, *Assistant Examiner.*